INVENTOR.
ROBERT G. MINER
BY Carl M. Lewis
ATTORNEY

INVENTOR.
ROBERT G. MINER
BY Carl M. Lewis
ATTORNEY

United States Patent Office 3,546,531
Patented Dec. 8, 1970

3,546,531
OVERCURRENT PROTECTION SYSTEM FOR POLYPHASE DYNAMOELECTRIC MACHINES
Robert G. Miner, La Crosse, Wis., assignor to The Trane Company, La Crosse, Wis., a corporation of Wisconsin
Filed Aug. 4, 1967, Ser. No. 658,543
Int. Cl. H02h 7/06
U.S. Cl. 317—13                                  2 Claims

ABSTRACT OF THE DISCLOSURE

An overcurrent protection system for a polyphase dynamoelectric machine which responds to substantially the sum of the currents in all phases of the machine. A small transformer is connected in series with each phase winding. The additory effect of the output of the secondary windings of the transformers is then applied to operate the machine contractor control relay.

SUMMARY OF THE INVENTION

Many types of motor overload protection devices are used to protect motors from burnout. Thermal protectors respond to the temperature of the motor or its windings while overcurrent protectors respond to the current in the windings. Some protection devices respond to a combination of current and temperature. Current responsive devices are generally faster in operation than thermal responsive devices and thus afford superior protection but usually at a premium cost.

The application of thermal protector devices to polyphase motors is generally no different than their application to single phase motors. The application of overcurrent protector devices to polyphase motors, however, is generally considerably more expensive as usually a separate control relay is provided for each phase. Any one of these relays can de-energize the motor as a result of overcurrent in the respective phase winding associated with the relay. Occasionally only two phases of a three phase Y-connected motor are provided with overcurrent relays as an overcurrent in the unprotected phase will usually result in an overcurrent in the other phases and thereby cause the protector to de-energize the motor. However, this type of protection is entirely inadequate in the event of a single phase fuse burnout on certain types of power supply transformers.

Individual phase overcurrent protection systems will de-energize the motor in response to an excessively high current in any one of a plurality of phases. This is accomplished through the use of a current responsive relay for each phase.

The burnout of any phase winding of a polyphase machine, however, ultimately takes place when the phase winding temperature of that phase becomes excessive and causes physical destruction of the phase winding.

In most polyphase dynamoelectric machines, the windings of any one phase are embedded and arranged in intimate thermal transfer relationship with the other phase windings. These other phase windings, if not overloaded, can serve to cool an overloaded phase winding and prevent its burnout. Thus, it can be appreciated that ultimate burnout of a phase winding is not entirely dependent upon the current in that phase and that conventional overcurrent protection of each phase is not by any means an accurate or perfect control despite its premium expense.

Having recognized these shortcomings of these prior art devices, I conceived the idea of an overcurrent protection system which substantially measures and responds to the total current applied to the plural windings of a polyphase dynamoelectric machine. While also being an imperfect control because of the imperfect and delayed heat transfer among the phase windings, this system is substantially lower in cost and easier to adjust than those systems using a current responsive relay for each phase.

In order to obtain a measure of this total current, I provide a small current transformer in series with each phase winding. The current in the secondaries of these transformers is substantially proportional to the current in the respective phase windings. The additory effect of the output of these secondary windings is then applied to operate a control switch for the contactor of the machine. The additory effect is obtained by first rectifying the output of the transformer secondary windings so that phase differences do not have a self canceling effect. Once rectified, the individual outputs are combined to operate the machine contactor control relay.

Specifically, this invention involves an overcurrent protection system for a polyphase dynamoelectric machine having at least three power lines for connection to a source of polyphase electric power comprising: a circuit closing means having a plurality of contacts interposed in said power lines and adapted to interrupt current flow through said machine; a first control circuit means for actuating said circuit closing means; a control switch operatively associated with said control circuit for controlling said circuit closing means; a plurality of current transformers each having a primary winding disposed respectively in series with one of said power lines and a secondary winding inductively coupled to said primary winding; plural rectifying means for rectifying the current induced respectively to each of said secondary windings; and means responsive to the additory effect of said rectified currents for actuating said control switch whereby said circuit closing means is actuated to interrupt current flow through said machine in response to a total current in all phases of said polyphase dynamoelectric machine in excess of a predetermined value.

Further aspects and advantages of the invention will become apparent as this specification proceeds to describe the invention in conjunction with the accompanying drawings wherein like elements have been designated by like numerals throughout and in which.

Figure 1:
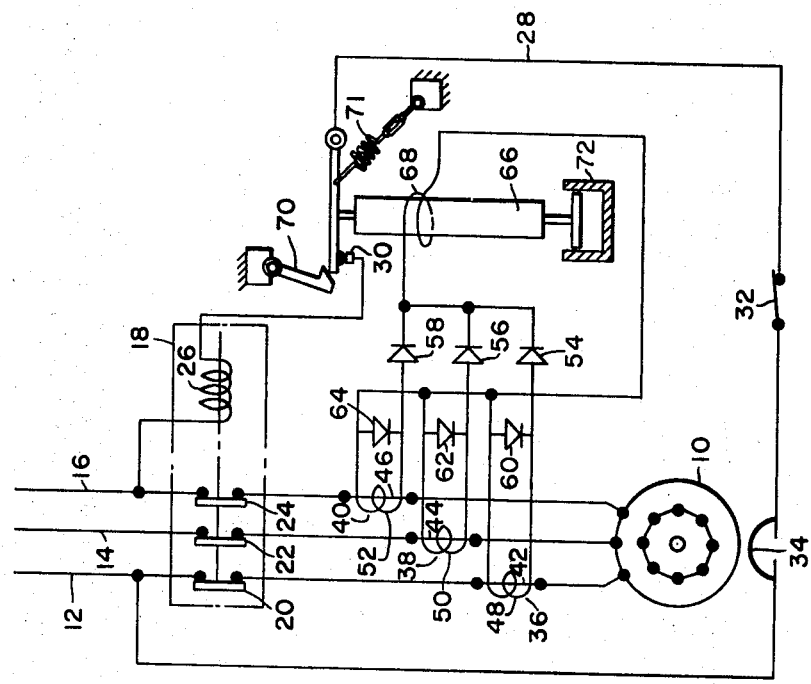
FIG. 1 shows an overcurrent protector system incorporating the invention wherein the currents from the current transformers of each phase are added to operate a dashpot time-delay control relay having a mechanical lockout mechanism.

Referring now more particularly to FIG. 1 of the drawings, I have shown one form of the invention as applied to a three phase induction motor 10. Induction motor 10 is the type in which the windings of one phase are embedded within the windings of the other phases thereby placing the windings of the several phases in intimate thermal transfer relationship. Lines 12, 14 and 16 connect motor 10 to a source of three phase electrical power. This power may be interrupted by de-energization of a circuit closing means such as contactor 18 having contacts 20, 22 and 24 in lines 12, 14 and 16 respectively which are normally held in the closed position during operation of motor 10 by energization of coil 26 of contactor 18.

Contactor coil 26 is energized by control circuit 28 which extends between lines 12 and 16 and serially connects coil 26, control switch 30, manual switch 32 and motor high temperature responsive safety switch 34. The opening of any of switches 30, 32 or 34 serves to de-energize coil 26 and open contacts 20, 22 and 24.

In order to operate switch 30 I have provided current transformers 36, 38 and 40 having their primary windings 42, 44 and 46 connected in series respectively with lines 12, 14 and 16 between the contacts of contactor 18 and motor 10. The secondary windings 48, 50 and 52 of these transformers have diodes 54, 56 and 58 respectively in series therewith and diodes 60, 62 and 64 respectively in parallel therewith. Diodes 54, 56 and 58 rectify the output from the secondaries of the current transformers so that one transformer output may be combined with another in an additory manner, i.e., without one output partially canceling the other because of phase differences. Diodes 60, 62 and 64 complete the circuits for the secondary windings during the half cycles when diodes 54, 56 and 58 are not conducting.

In the system shown in FIG. 1, switch 30 is actuated to an open position by upward movement of the solenoid (actuator) plunger 66 of a dashpot time-delay relay. The solenoid coil 68 for actuating plunger 66 in the upward direction is connected in series with the parallel combinations of the series connected components of secondary winding 48 and diode 54; secondary winding 50 and diode 56; and secondary winding 52 and diode 58. Thus, one-half wave output of the currents induced to the secondary windings 48, 50 and 52 is collectively directed through coil 68. When this collective current exceeds a predetermined safe value, switch 30 is opened which de-energizes contactor coil 26 causing contacts 20, 22 and 24 to open and de-energize motor 10. A mechanical latch 70 is provided to hold switch 30 in the open position so that motor 10 cannot be restarted until the latch is manually reset. A spring bias adjustment 71 is provided at switch 30 for adjustably varying the predetermined value at which switch 30 is opened.

To prevent switch 30 from being prematurely opened by motor surge currents at startup, plunger 66 is provided with a dashpot delay mechanism 72.

Figure 2:
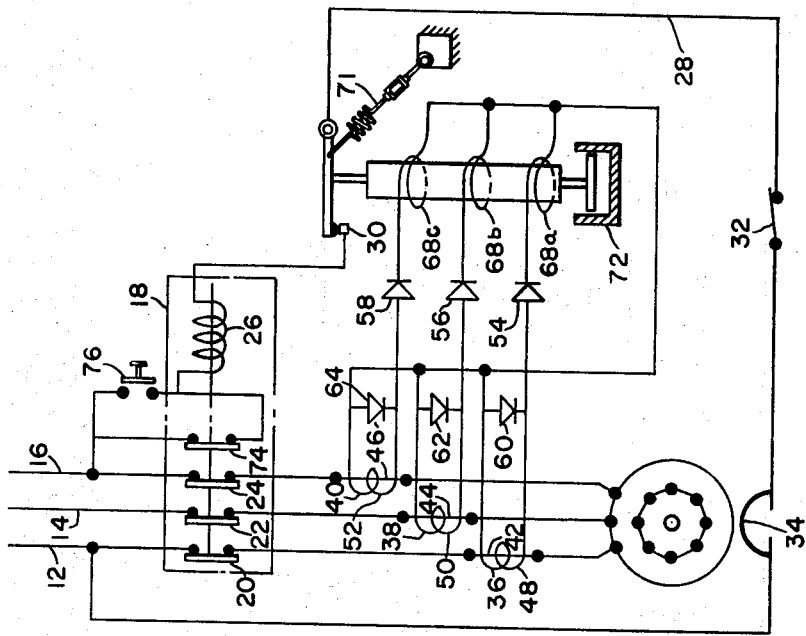
FIG. 2 shows a modification of the system of FIG. 1 wherein the current transformers separately energize separate windings on a single dashpot time-delay control relay and wherein the mechanical lockout mechanism has been replaced by an electrical lockout.

The control system shown in FIG. 2 is similar in structure and operation to that shown in FIG. 1 except that the mechanical lockout mechanism 70 has been replaced by an electrical lockout mechanism and that the single relay coil 68 has been replaced by three relay coils 68a, 68b and 68c each of which is in series with but one of the secondary windings of the current transformers.

Coils 68a, 68b and 68c are respectively in series with the series combinations of secondary winding 48 and diode 54, secondary winding 50 and diode 56, and secondary winding 52 and diode 58. In contradistinction to the arrangement of FIG. 1, each relay coil conducts a current corresponding only to the current induced into the secondary winding in series therewith. While the several currents are not added in a single coil as in FIG. 1, it will be readily appreciated that the currents are unidirectional and that the polarity and coil winding direction are selected so that the magnetomotive force of each of coils 68a, 68b and 68c is in a common direction and the additory effect of these forces operates plunger 66 to actuate switch 30 in a manner similar to that described in connection with FIG. 1.

The electrical lockout shown in FIG. 2 includes a normally open holding contact 74 actuated to the closed position by energization of coil 26 and a normally open reset switch 76 arranged in parallel with contact 74 and in series with contactor coil 26. If for any reason one of switches 30, 32 or 34 is opened and contactor coil 26 de-energized, contact 74 is opened thereby preventing re-energization of the contactor coil 26 until reset switch 76 is momentarily closed, thus precluding restarting of motor 10 until the system is reset. This reset system may be operated remotely as switch 76 may be placed wherever desired. The lockout system shown in FIG. 2 is considered to be an alternative to the mechanical system of FIG. 1 and one system may be substituted for the other.

Figure 3:
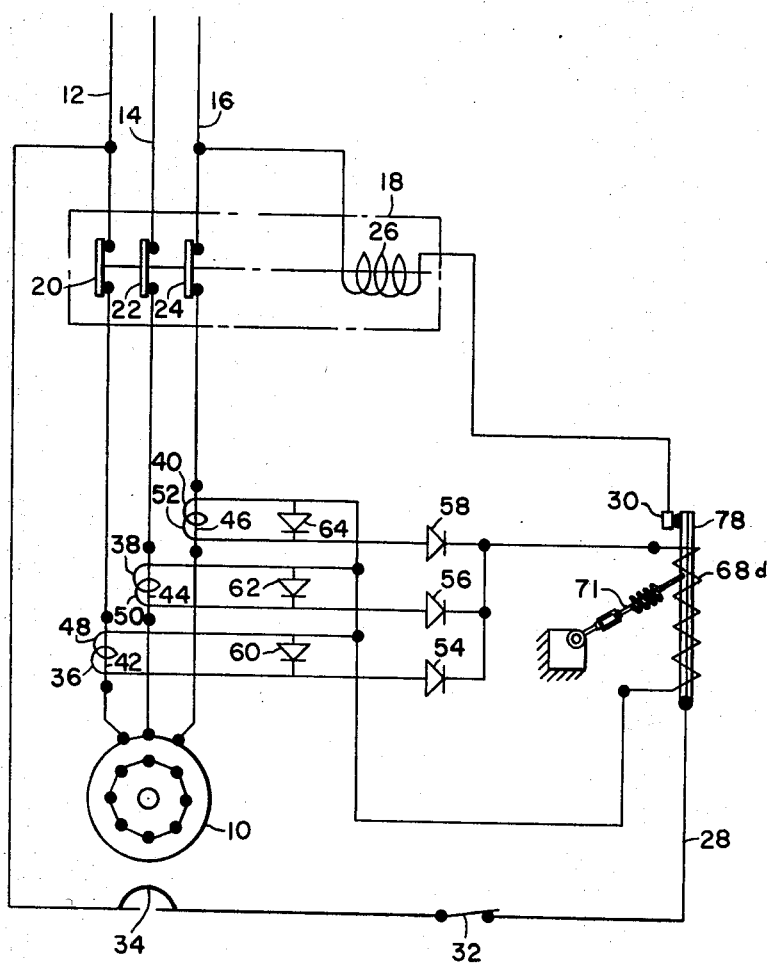
FIG. 3 shows a modification of the system of FIG. 1 wherein the dashpot time-delay relay is replaced by a bimetal relay.

The control system shown in FIG. 3 is similar in structure and operation to the system shown in FIG. 1 except that the coil 68 has been replaced by a heater coil 68d having substantially higher resistance for heating a bimetallic element actuator 78 operatively connected to actuate switch 30. When the current in coil 68d, which is the additory effect of the outputs of each of the current transformers, exceeds a predetermined value, bimetallic element 78 is heated sufficiently to open switch 30 causing de-energization of contactor coil 26 which in turn opens contacts 20, 22 and 24 to de-energize motor 10. Because of the inherent thermal time delay of this system, a dashpot mechanism as shown with the systems of FIGS. 1 and 2 is normally not required. If desired, the system of FIG. 3 may be provided with either a mechanical lockout as shown in FIG. 1 or an electrical lockout as shown in FIG. 2.

I claim:
1. An overcurrent protection system for a polyphase dynamoelectric machine having at least three power lines for connection to a polyphase electric power system comprising: a circuit closing means having a plurality of contacts interposed in said power lines and adapted to interrupt current flow through said machine; a first circuit means for actuating said circuit closing means; a control switch operatively associated with said first circuit means for controlling said circuit closing means; a plurality of current transformers each having a primary winding disposed respectively in series with one of said power lines and a secondary winding inductively coupled to said primary winding; a heat responsive switch actuator means for actuating said control switch; an electrical resistance means for heating said heat responsive switch actuator means; second circuit means for placing said electrical resistance means in conducting relation with said plurality of secondary windings whereby said circuit closing means is actuated to interrupt current flow through said machine in response to a total current in all phases of said polyphase dynamoelectric machine in excess of a predetermined value; a plurality of current rectifiers, each disposed in series with one of said secondary windings for conducting current during one-half cycle to said electrical resistance means; and a second plurality of rectifiers each disposed with respect to one of said secondary windings for conducting current during the other half cycle.

2. The apparatus as defined by claim 1 wherein each of said second rectifiers shunt its respective secondary winding.

References Cited

UNITED STATES PATENTS

| 2,967,977 | 1/1961 | McNicol et al. __ (317)—(13.3) |
|---|---|---|
| 2,242,950 | 5/1941 | Harder _____ 317—27X |
| 2,672,584 | 3/1954 | Rolf _____ 317—27X |
| 1,702,454 | 2/1929 | Todd _____ 317—46X |
| 1,913,639 | 6/1933 | Rice _____ 317—13X |
| 2,885,568 | 5/1959 | Reeder et al. _____ 317—13X |
| 2,930,938 | 3/1960 | Tapper _____ 317—46 |
| 3,107,318 | 10/1963 | Lytle _____ 317—13 |
| 3,110,844 | 11/1963 | Brandt _____ 317—46X |
| 3,119,951 | 1/1964 | Davy _____ 317—13 |
| 3,243,658 | 3/1966 | Blackburn _____ 317—50X |
| 3,309,478 | 3/1967 | Kiesel et al. _____ 317—46X |

WILLIAM M. SHOOP, JR., Primary Examiner

U.S. Cl. X.R.

317—27, 46